L. BOIRAULT.
APPARATUS FOR BRAKING VEHICLES.
APPLICATION FILED DEC. 23, 1909.

998,458.

Patented July 18, 1911.
10 SHEETS—SHEET 2.

WITNESSES

INVENTOR
Louis Boirault

ATTORNEYS

L. BOIRAULT.
APPARATUS FOR BRAKING VEHICLES.
APPLICATION FILED DEC. 23, 1909.

998,458.

Patented July 18, 1911.
10 SHEETS—SHEET 3.

WITNESSES
J. P. Davis

INVENTOR
Louis Boirault
BY
ATTORNEYS

L. BOIRAULT.
APPARATUS FOR BRAKING VEHICLES.
APPLICATION FILED DEC. 23, 1909.

998,458.

Patented July 18, 1911.
10 SHEETS—SHEET 5.

L. BOIRAULT.
APPARATUS FOR BRAKING VEHICLES.
APPLICATION FILED DEC. 23, 1909.

998,458.

Patented July 18, 1911.
10 SHEETS—SHEET 6.

WITNESSES

INVENTOR
Louis Boirault

ATTORNEYS

L. BOIRAULT.
APPARATUS FOR BRAKING VEHICLES.
APPLICATION FILED DEC. 23, 1909.

998,458.

Patented July 18, 1911.
10 SHEETS—SHEET 8.

UNITED STATES PATENT OFFICE.

LOUIS BOIRAULT, OF PARIS, FRANCE.

APPARATUS FOR BRAKING VEHICLES.

998,458.   Specification of Letters Patent.   Patented July 18, 1911.

Application filed December 23, 1909. Serial No. 534,631.

*To all whom it may concern:*

Be it known that I, LOUIS BOIRAULT, a citizen of the Republic of France, residing at 20 Rue Laffitte, Paris, in the Republic of France, engineer, have invented certain new and useful Improvements in Apparatus for Braking Vehicles, of which the following is a specification.

This invention has for its object an apparatus for braking of the kind in which the application of the brake shoes to the wheels is obtained by the action of a cam fixed to the axle of a pair of wheels and acting upon an operating lever which is caused to approach or separate from this cam in accordance with requirements.

The present invention relates more particularly to a device which permits of displacing the operating lever either by hand from the vehicle or from the ground or by means of compressed air or of a vacuum, either at the will of the driver of the train or automatically in case a coupling should break; this device is arranged in such a manner that operation by hand and operation by air are independent of and never oppose each other.

The drawings filed herewith show several constructional forms of brake in accordance with this invention, in which:

Figs. 11 to 17 represent a second constructional form of the mechanism serving to bring the operating member closer to or separate it from the axle cam and to lock the brake rods in the position in which the brakes are applied.

Figure 1:
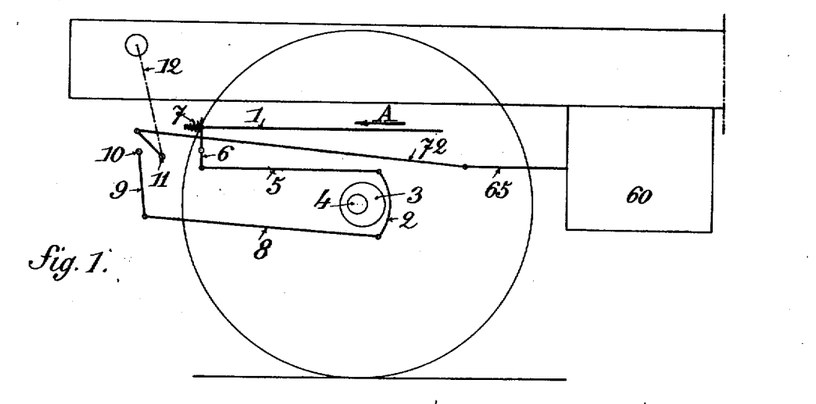
Figure 1 is a diagram indicating the arrangement of the operating means as a whole upon a truck.

Of the various brake rods only the operating rod 1 has been represented in Fig. 1; it is only necessary to pull this rod in the direction indicated by the arrow A in order to press the brake blocks against the wheels.

The necessary tractive effort is obtained by means of a lever 2 and of a cam 3, this latter being fixed upon an axle 4 of the truck; one extremity of the lever 2 is connected with the rod 1 by the intermediary of a rod 5, of a beam 6 and of a spring 7, and the other extremity of the lever 2 is connected by a rod 8 with a lever 9 rocking around a pivot 10 fixed to the frame of the truck.

Figure 3:
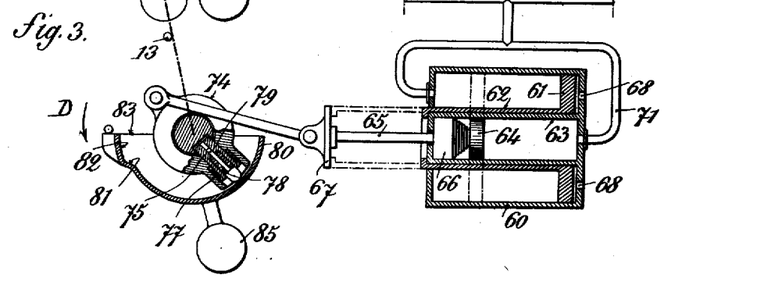
Figure 4:
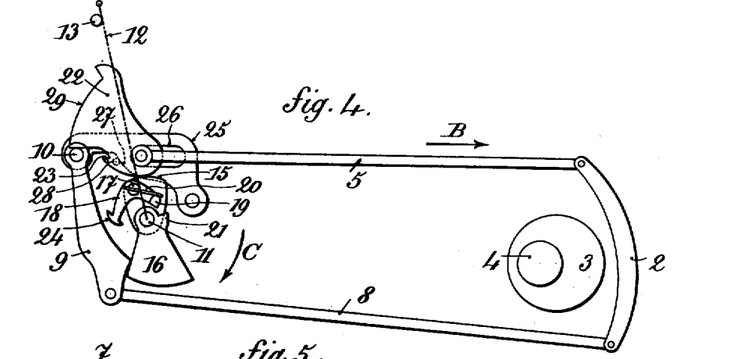
Fig. 4 is an elevation of another part of the means for operating the brake.
Figure 5:
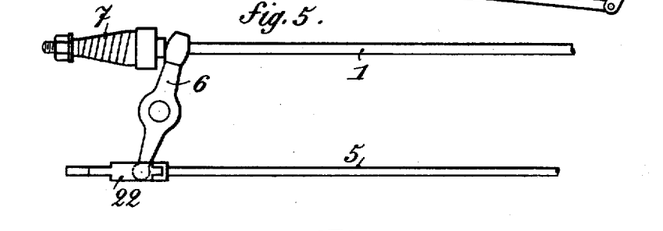
Fig. 5 is a partial plan corresponding to Fig. 4.
Figure 6:
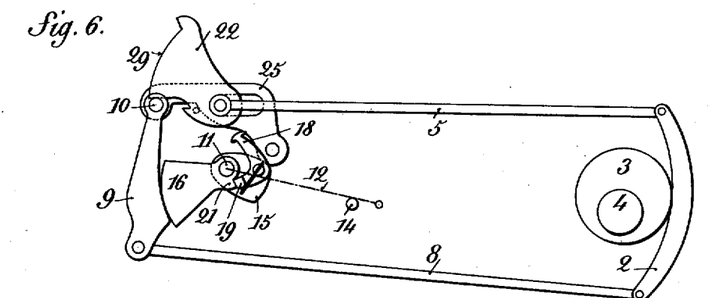
Figs. 6, 7 and 8 represent the same part of the operating device in different positions.

When the lever 9 occupies the position shown in Fig. 4, the lever 2 is outside the field of action of the cam 3 and the brakes are released. When the lever 9 is pressed back as shown in Fig. 6 the lower extremity of the lever 2 is displaced in such a manner that this lever enters the field of action of the cam 3; and as soon as the cam acts upon the lever the upper extremity of the lever 2 is displaced in the direction of the arrow B and produces the necessary traction upon the rod 1 by the intermediary of the parts 5, 6, 7 in such manner as to apply the brakes. The parts mentioned above as a whole are known *per se* and form no part of the present invention.

The invention has for its object to provide a device as a whole which serves to displace the lever 9 by action exerted by a man either on the ground, or in the vehicle to which the brake is fitted, or in another vehicle or on the locomotive, either through the medium of a hand lever or a mechanical transmission, or a cock on the train pipe for compressed air or vacuum brakes; the same device is also capable of acting automatically should the said train pipe break.

Beneath the frame of the vehicle there is mounted a shaft 11 upon the ends of which levers 12 provided with counterweights are fixed; these levers are capable of displacement between two stops 13 and 14. This shaft carries a fixed cam 15 and a loose cam 16, this latter being arranged opposite the lever 9. Upon the cam 15 there is fixed a pivot 17 carrying a bent lever 18 one extremity 19 of which is pressed by a spring 20 toward the cam 16, and is able to come into contact with a projection 21 upon the latter.

Figure 7:
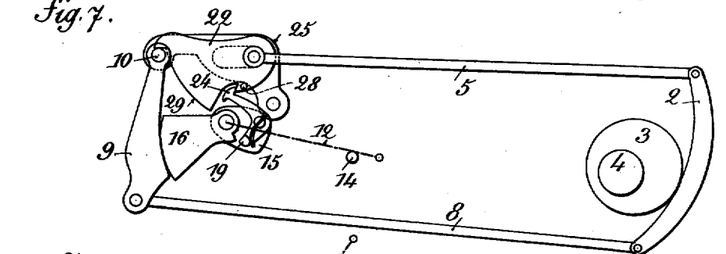

The beam 6 is jointed to the rod 5 by means of an appropriate ball and socket joint around which these two parts and also another part, the pawl 22, are able to oscillate; this pawl serves to hold the brakes in their applied position. With this object the pawl comprises a projection 23 adapted for engaging a corresponding projection 24 formed upon the lever 18, as shown in Fig. 7. When this pawl is displaced with the rod 5 and the beam 6, it is guided by means of a fixed plate 25 comprising a groove 26 for the guidance of the beam, and a cam face 27 for the guidance of a stud 28 solid with the pawl; the latter itself comprises a cam face 29 adapted to slide upon the fixed pivot 10.

Figure 8:
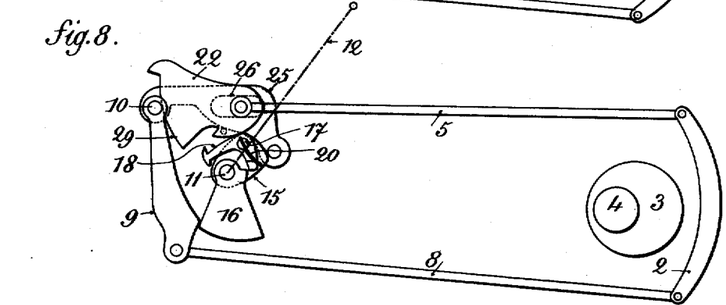

The parts described above operate in the following manner: When the levers 12 are lifted against the stops 13, the loose cam 16 hangs freely opposite the lever 9 and the brakes are released. If the shaft 11 then rotates in the direction indicated by the arrow C, either under the influence of manual effort upon one of the levers 12, or otherwise, the cam 15 rotates with the lever 18, the extremity 19 of this lever strikes the projection 21 of the cam 16, this latter is displaced and strikes against the lever 9; it forces back this lever (Fig. 6) in such a manner that the lever 2 (Fig. 1) enters the field of action of the cam 3. The brake is then applied by the action of this cam. At the same time the rod 5 exerts a tractive effort upon the pawl 22, causing it to oscillate in proportion as the stud 28 slides beneath the surface 27. Owing to this oscillation the pawl presses the projection 24 of the bent lever 18 and causes it to rock in such a manner that the extremity 19 moves away from the projection 21 of the cam 16 at the same time that the projection 23 of the pawl passes over the projection 24 of the lever and allows it to rise slightly under the influence of the spring 20 causing the projections 23 and 24 to interengage (Fig. 7). These movements of the pawl and of the lever 18 take place while the cam 3 presses back the lever 2. As soon as this cam leaves the lever 2, the brake tends to become released, but is prevented from doing so by the pawl 22 which is engaged with the lever 18 and locks the beam 6. A tractional effort is therefore no longer exerted upon the lever 9, which allows the loose cam 16 to rotate under the influence of gravity around the shaft 11; this cam then assumes the position shown in Fig. 8, while the system constituted by the parts 28 and 29, is likewise released and the lever 2 is not exposed to wear by the cam 3. When the shaft 11 is rotated in the direction opposite to the arrow C, the fixed cam 15 displaces the lever 18, and releases the pawl 22 causing it to rise and its surface 29 to slide upon the pivot 10. The extremity 19 of the lever 18 passes over the projection 21 of the cam 16, the projections 23 and 24 become disengaged, the brake is released and the various parts of the device resume the position shown in Fig. 4.

It should be noted that the return movement of the shaft 11 does not necessitate any considerable effort, because when once the brake is applied the tractive effort of the rod 1 acts only upon the jointed system formed by the pawl 22, the lever 18 and the cam 15 and is largely balanced by the reaction of the pivot 10 upon the face 29 of the pawl, the inclination of this surface being approximately equal to the angle of friction; the supplementary action of the counterweight 12 fully provides against accidental lifting of the pawl. It will also be noticed that this tractional effort exerts no action upon the system constituted by the parts 5, 2, 8, 9, 16.

Figures 9, 10:
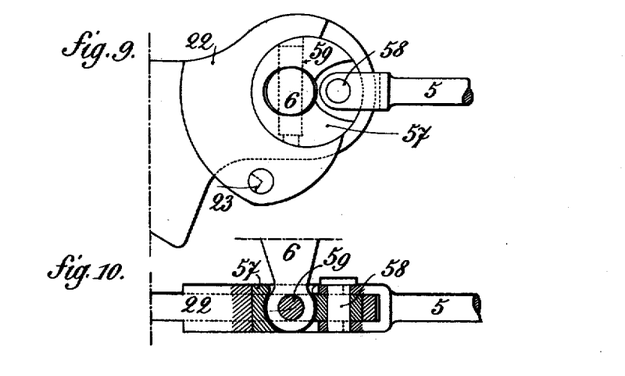
Figs. 9 and 10 show details of this device in elevation and in horizontal section respectively.

The articulation of the three parts 5, 6 and 22 is arranged as shown in Figs. 9 and 10; in a circular opening in the pawl 22 there is fitted a part 57 which is connected by a pawl 58 with the forked extremity of the rod 5 and by a pivot 59 with the extremity of the beam 6, these two pivots being at right angles one to the other.

In order to actuate the shaft 11 by means of compressed air or by vacuum indifferently, there is fixed to the vehicle frame a cylinder 60 in which an annular piston 61 moves; the rod 62 of this piston is hollow and incloses a second cylinder 63 solid with the first. Inside the cylinder 63 there slides a second piston 64 to which a rod 65 is fixed and upon which a strong spiral spring 66 acts; the rod 65 carries a disk 67 against which the outer extremity of the hollow rod 62 is able to strike. One extremity of the cylinder 60 communicates with the atmosphere by means of orifices 68 and its opposite extremity communicates by means of a pipe 69 with the general train pipe 70. The cylinder 63 also communicates on one side with the pipe 70 by means of a pipe 71 and on the opposite side with the atmosphere by means of orifices, not shown. Finally a connecting rod 72 connects the rod 63 with an arm 73 of a sleeve 74 mounted upon the shaft 11.

When a sufficiently high pressure obtains in the pipe 70 and the cylinders, the piston 61 is held to the right and the piston 64 is pressed to the left as shown in Figure 3. The spring 66 is then compressed and the sleeve 74 is rotated into the position which corresponds with the release of the brake. If the pipe is opened intentionally or accidentally, the pressure decreases in the cylinders and the spring 66 forces the piston 64 to the right hand, which causes the sleeve 74 to oscillate toward the braking position (Fig. 2); if the fall of pressure is partial, the piston 64 assumes a position of intermediate equilibrium, as does also the sleeve 74, which permits of moderating the braking at will.

When there is a vacuum in the pipe 70 and in the cylinders, the atmospheric pressure forces the piston 64 to the right and the piston 61 to the left, and as this latter has a much larger area than the area of the piston 64, it displaces the latter in pressing by means of its hollow rod 62 the disk 67 as indicated in broken lines in Fig. 3. The sleeve 74 is thus rotated into the releasing position by the action of the vacuum in the same manner as by the action of compressed air. If the air re-enters the pipe 70, the air pressures are equalized upon the faces of the piston and they resume the position shown in Fig. 2 under the influence of the spring 66, in producing the application of the brake as mentioned above.

In order to render the system of pistons independent of the hand control, the sleeve 74 is loosely mounted on the shaft 11 and an engaging bolt 75 is guided in this sleeve in such a manner that it can engage in a mortise 76 in the shaft. This bolt consists of a socket presenting an external shoulder beneath which a spring 77 acts and an inner shoulder upon which a spring 78 rests; this spring is stronger than the spring 77. Inside this socket a piston 79 is capable of displacement; this piston bears on the one hand upon a spring 78 and on the other on a guide way 80 the greater portion of which is concentric with the shaft 11 and which presents an incline 81 and portion 82 of greater radius at a given point. This guide way is carried by a check 83, which is freely suspended from the shaft 11, and it is normally held stationary against a fixed stop 84, by the action of a counter-weight 85.

Figure 2:
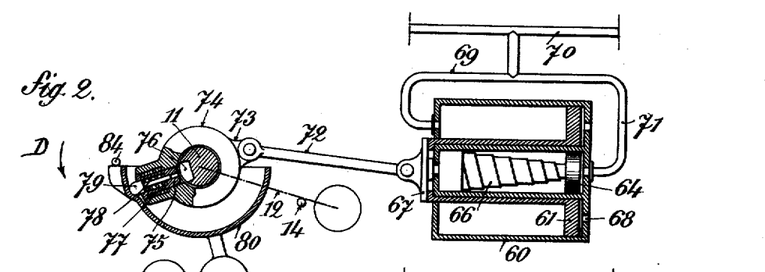
Figs. 2 and 3 illustrate diagrammatically air and vacuum cylinders and pistons and a coupling device.

When the sleeve 74 and the shaft 11 are completely rotated as shown in Fig. 2, the springs 77 and 78 are extended, the spring 77 holding the bolt 75 free from the mortise 76 and the spring 78 holding the piston 79 in contact with the part 82 of the guide way 80. If the sleeve remains motionless, the shaft 11 may be rotated independently of this sleeve for applying and releasing the brake. On the other hand if the sleeve 74 is rotated in the direction indicated by the arrow D, the piston 79 rides up upon the incline 81 and compresses the spring 78 in such a manner that the bolt 75 engages in the mortise 76 as soon as it comes opposite it; the shaft 11 is then engaged with the sleeve 74 and follows the movements of this sleeve until the piston 79 has again come opposite the hollow part 82.

When the truck provided with the brake in accordance with the present invention is isolated, atmospheric pressure obtains in the pipe 70 and the sleeve 74 occupies the position shown in Fig. 2, the bolt 75 is released from the mortise 76 and the brake can be applied or released by hand by acting upon one of the levers 12. The truck can be coupled between trucks provided with atmospheric or vacuum brakes of any kind, and the brake pipes of all the vehicles of the train are connected, in the usual manner. Before the train is moved the driver produces either pressure or vacuum in the train pipe, in such a manner that the sleeve 74 is caused to occupy the position shown in Fig. 3; if the brake is already released, the bolt 75 enters the mortise 76 at the end of its travel; if on the other hand, the brake is applied, the bolt 75 at once engages in the mortise 76 and displaces the shaft 11 in such a manner as to release the brake. While the train is running, the bolt always remains engaged in the mortise, in such a manner that the shaft 11 is obliged to follow the action of the pistons 64, 61. The brake is necessarily applied when the pressure or the vacuum is decreased in the pipe 70.

It has been stated above that the application of the brake can be moderated at will by the driver, in accordance with the degree of pressure or of vacuum that he produces in the train pipe; it can also be moderated at will by a man acting from the ground upon the lever 12, in accordance with the position in which he holds this lever, or else by the brakesman who acts from this vehicle upon the shaft 11, according to the position that he gives to the lever or to the corresponding operating hand wheel, which is not here shown. This capacity, for moderating the braking effect exists because the pawl 22 comprises an inclined bearing surface and is consequently able to hold the beam 6 at a variable distance from the pivot 10; and also because the inclination of this surface is inconsiderable enough to prevent it from sliding upon this pivot 10 under the influence of the pressure.

If during a stop the sleeve 74 is rotated in such a manner the bolt 75 has traversed one half its rocking path and is engaged in the mortise 76, and if it be desired to release the brake by hand, it is necessary to release the bolt from the shaft 11 because the compression of the spring 66 would oppose excessive resistance. In order to obtain this release, the guideway 80 is rotated by hand around the shaft 11 in order to bring the cavity 82 opposite the bolt 75 which is forced into it by the weak spring 77. The shaft 11 can then be rotated in the direction for releasing the brakes without any difficulty, while the bolt 75, the sleeve 74 and the pistons 61, 64 remain at rest.

In the construction shown in Figs. 11 to 17, the operating member actuated by the axle cam 3 does not consist of a lever 2 but a shoe $2^a$ which is rigid with a connecting rod $8^a$, one end of which is suspended from the vehicle frame by a rocking rod $8^b$ while its other end is jointed to the lower end of a lever $9^a$. The latter is suspended by its upper end from a horizontal lever $6^a$ which rocks around a fixed point $6^b$ upon the frame and which by means of a spring 7 serves to press in the direction of the arrow A, the rod 1 actuating the brake rods.

The lever $9^a$ may be displaced by a cam $16^a$ movable around the operating shaft $11^a$; this cam is provided with hollow trunnions $16^b$ and $16^c$ which rest in fixed supports and through which the shaft $11^a$ passes with considerable play, in such a manner that the radial reactions experienced by the cam are transmitted directly to the supports but are not received by the shaft.

The shaft $11^a$ is operated by means of a crank 12 at each end and a counterweighted lever $12^a$ is also keyed upon it; the cam $16^a$ participates in the rotation of the shaft $11^a$ with a certain amount of play, by means of projections $16^d$ and $12^b$ formed on one of the trunnions of the cam and the hub of the lever $12^a$.

The cam $16^a$ does not act directly upon the lever $9^a$ but upon a support $9^b$ which is pivoted at $9^d$ on the lever $9^a$ in such a manner that it can rock slightly, this part being formed in such a way as to present for contact with the cam a wide curved shoe $9^c$ which rests directly upon the incline $16^e$ of this cam (Fig. 15) this arrangement serves to reduce the wear of the frictional parts and to bring the center of oscillation of the lever onto its longitudinal axis.

If the shaft $11^a$ be caused to rock in the direction indicated by the arrow C (Fig. 11) the cam $16^a$ is displaced in this direction and presses the lever $9^a$ with the connecting rod $8^a$ toward the axle 4; the axle cam 3 then acting upon the shoe $2^a$ then presses the rod $8^a$ and the lever $9^a$ rearward (Fig. 15) in such a manner that this lever, bearing against the cam $16^a$ is caused to rock in the direction indicated by the arrow $C^1$ around the pivot $9^d$; it thus produces the oscillation of the lever $6^a$ which by means of the spring 7 displaces the rod 1 in the direction indicated by the arrow A, thereby applying the brakes.

Figures 15, 16, 17:
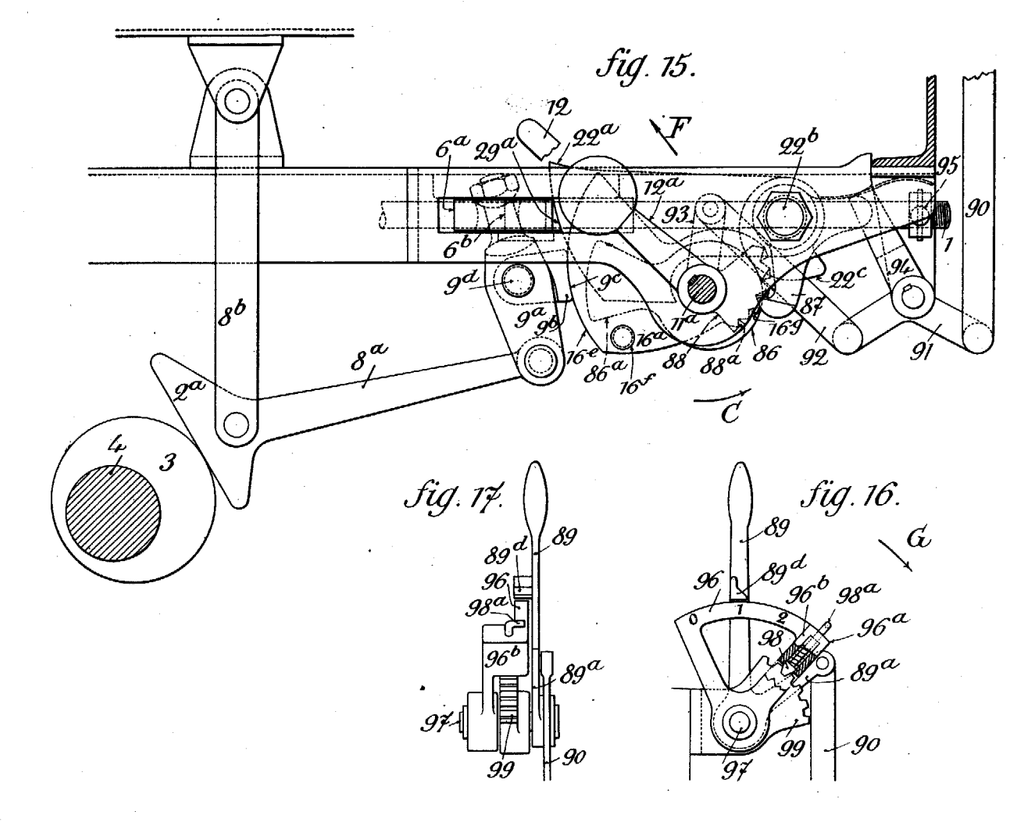
Fig. 15 is an elevation of the same mechanism in operative position.
Fig. 16 is an elevation of a braking indicator.
Fig. 17 is a side-elevation of this device.

In order to maintain the brakes applied, a locking member or pawl $22^a$ is pivoted on a fixed pivot $22^b$ and serves for supporting the lever $6^a$; when this lever rocks in the direction for the application of the brakes, the pawl falls under gravity behind the lever $6^a$ and the latter is prevented from moving backward. The inclined $29^a$ of the pawls, upon which the lever $6^a$ rests, presents relatively to the radii of the pawl an inclination which is preferably equal to or slightly greater than the angle of friction. However, when this inclination is greater than the angle of friction, the weight of the pawl may be insufficient to prevent it from rising under the reaction of the lever $6^a$. This lifting is prevented by means of a locking cam 86, which is freely mounted around the support $16^h$ of the trunnion $16^c$, its spiral surface being able to act upon the corresponding surface of a projection $22^c$ solid with the pawl $22^a$; for this purpose the cam 86 is loaded with a heavy extension $86^a$ which rests upon a stud $16^f$ on the cam $16^a$ when the latter is at rest, and which causes the cam 86 to rotate in the direction indicated by the arrow C when the brakes are applied, until the incline of this cam 86 is applied to the projection $22^c$. Fig. 15 shows that the lifting of the pawl $22^a$ is positively prevented by this means, because the radii of the parts 86 and $22^c$ increase below their point of contact, and their displacement in the direction indicated by the arrow F is prevented by wedging. This device is quite certain in its action and very easy to disengage because the friction between the cam 86 and the projection $22^c$ is only created under the influence of an effort received by the pawl $22^a$, which effort is but a feeble component of the pressure exerted by the lever $6^a$ upon this pawl. The disengagement is produced when the shaft $11^a$ is rotated in the opposite direction to that indicated by the arrow C, because the cam $16^a$ in rising in the first place by means of its stud $16^f$ lifts the extension $86^a$ of the cam 86 and causes the latter to turn presenting decreasing radii opposite the projection $22^c$. The pawl $22^a$ then rises under the pressure of the lever $6^a$ and under the direct action of the stud $16^f$.

In order to increase the degree of certainty, a spring pawl 87 pivoted to the pivot $22^b$ is arranged in such a manner as to engage its nose in notches $16^g$ formed in the periphery of the cam $16^a$, and thereby prevent this cam from turning accidentally in the opposite direction to that of the arrow C; for example if this cam should experience a reaction from the lever $9^a$ before the incline $29^a$ of the pawl has fallen behind the lever $6^a$. In order that this pawl may not prevent the cam from returning to rest when the shaft $11^a$ is rotated in the direction for releasing the brakes, a toothed sector 88 is employed; this sector is fixed to the shaft 11ᵃ and carries a series of inclined planes 88ᵃ corresponding to the notches 16ᵍ. The angular play between the shaft 11ᵃ and the cam 16ᵃ is precisely equal to the angular width of the inclined planes 88ᵃ and to half the angular interval existing between the axes of the notches 16ᵍ; in the position of rest (Fig. 11) the planes 88ᵃ are opposite the notches, while if the shaft 11ᵃ and the sector 88 be rotated in the direction indicated by the arrow C (Fig. 15), the inclined planes advance opposite the solid parts of the cam and the notches 16ᵍ are disengaged. Consequently, when the brakes are applied, the nose of the pawl engages in the said notches and prevents the cam from returning, while when the shaft 11ᵃ is rotated for releasing the brakes, the inclined planes 88ᵃ advance in front of the notches, lift the pawl out the engagement with them and prevent the pawl from retaining the cam 16ᵃ. For greater safety when the brakes are applied, the notches 16ᵍ are arranged in steps in such a manner that the pawl 87 cannot jump over these notches.

Figure 11:
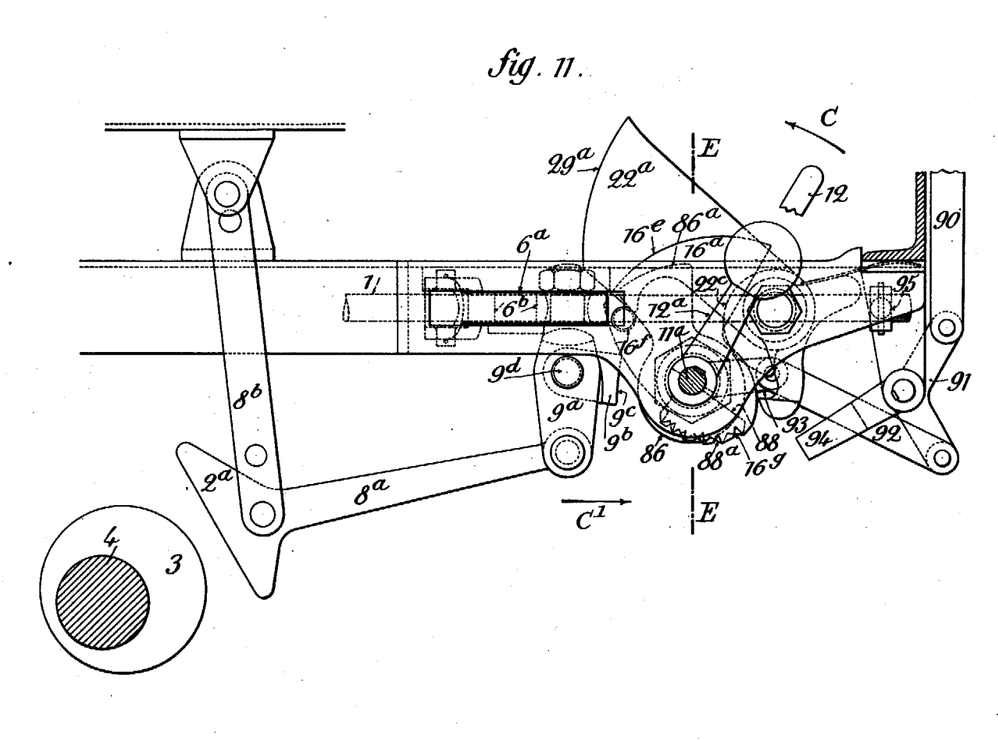
Fig. 11 is an elevation of this mechanism in the condition of rest.
Figure 12:
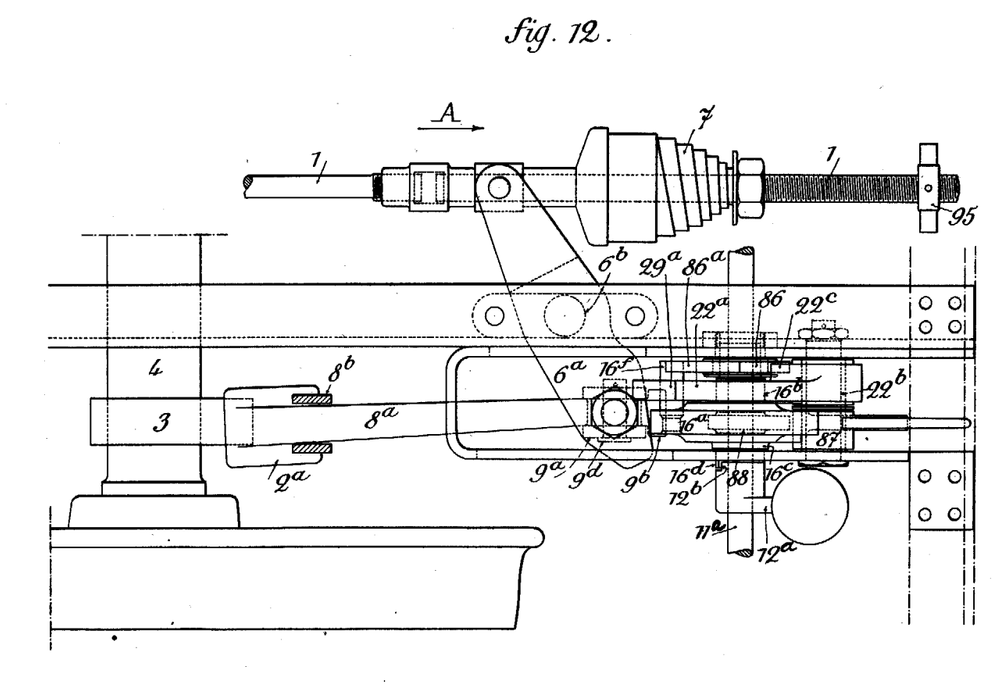
Fig. 12 is a plan view of same.
Figure 13:
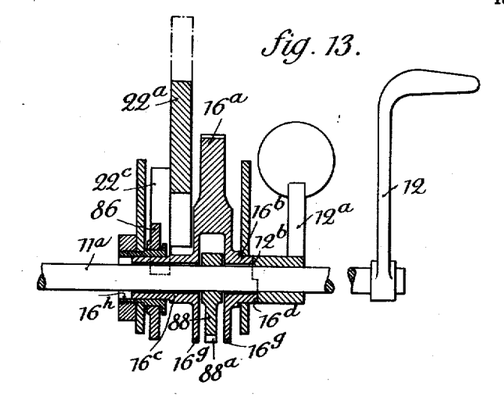
Fig. 13 is a vertical section on the line E—E in Fig. 11.
Figure 14:
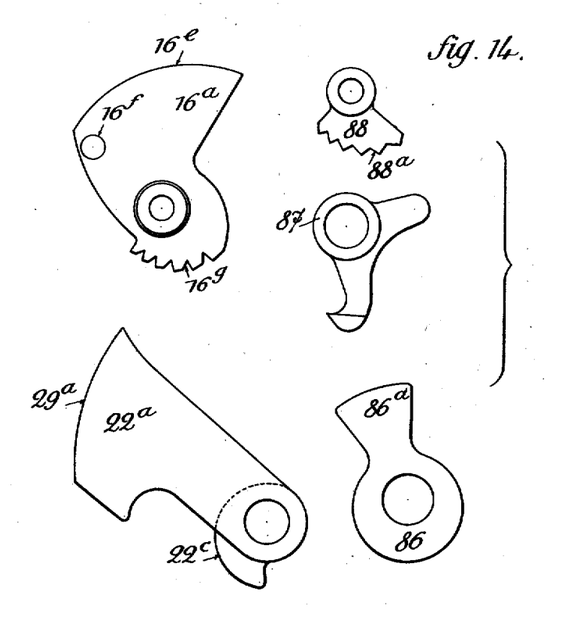
Fig. 14 represents separated parts of the mechanism in elevation.

The shaft 11ᵃ may be controlled not only by means of the levers 12 fixed to its ends, but also by means of a hand lever 89 (Figs. 16 and 17) arranged in the lookout or cab and connected with the shaft 11ᵃ by means of suitable transmission members comprising say an arm 89ᵃ rigid with the lever 89, a connecting rod 90, a bent lever 91, a rod 92, and an arm 93 fixed on the shaft 11ᵃ (Figs. 11 and 15).

It will be understood that the brakes will be applied with increasing force in proportion as the cam 16ᵃ presses the lever 9ᵃ farther toward the axle 4, and consequently that the shaft 11ᵃ will be rotated increasingly in the direction indicated by the arrow C. On the other hand, in order to compensate for the wear of the brake shoes and of the joints of the brakework, it is necessary to turn the shaft 11ᵃ more and more in proportion as wear takes place, in order to obtain a given braking effect. In order to limit automatically the rotation of the shaft 11ᵃ and of the cam 16ᵃ in such a manner as always to obtain the same maximum braking effect, a device is used which renders the maximum amplitude of this rotation dependent upon the travel of the rod 1 connected with the brake rods. For this purpose a forked arm 94 is rigid with the lever 91 and is arranged in such a manner that it can strike against a stop 95 adjustably secured to the rod 1. When the shaft 11ᵃ is rotated in the direction indicated by the arrow C, and then released, the counterweight 12ᵃ tends to cause it to rotate farther in the same direction so long as the axle cam 3 does not press the lever 9ᵃ against the cam 16ᵃ, and the rotation of the latter is not limited except when the arm 94 encounters the stop 95. Naturally in proportion as the brake shoes wear, the rod 1 advances farther in the direction indicated by the arrow A, in order to apply the brakes to the wheels in such a manner that the arm 94 rocks farther, consequently enabling the cam 16ᵃ to descend farther and produce the necessary additional application of the brakes.

In addition, it is advantageous to be able to regulate the application of the brakes at will, and for this purpose a pressure indicator is employed, its position varying automatically according to the extent to which the brake shoes and the brakework are worn. The device which is represented by way of example in Figs. 16 and 17, comprises an indicating sector 96 upon which the numerals 0, 1, 2 or other marks indicate the positions of the crank 89 corresponding respectively to the release of the brakes, to a slight application and to a medium application; the end 96ᵃ of the sector corresponds to the maximum application. This sector 96 is displaceable around the shaft 97 of the crank and it is stopped in a variable position by means of a spring bolt 98, which is mounted in a boss 96ᵇ of the said sector and which engages in the notches of a fixed sector 99. The tail 98ᵃ of the bolt is arranged in such a manner as to be lifted by an inclined plane 89ᵈ of the crank 89, when the latter reaches the end 96ᵃ of the sector 96. The result is that every time the brake shoes become worn to a certain extent, if the crank is pushed to the end of its stroke for obtaining the maximum application, the bolt 98 is released from the sector by the inclined plane 89ᵈ and the sector 96 is displaced as far as the crank is able to go; as soon as the crank is brought rearward again, the bolt 98 engages in the corresponding notch in the fixed sector 99 so that the position of the indicating sector 96 is regulated. This sector is thus caused to advance in the direction indicated by the arrow G in proportion as the brake shoes wear, in such a manner that the indications 0, 1, 2 are always correct.

Figure 18:
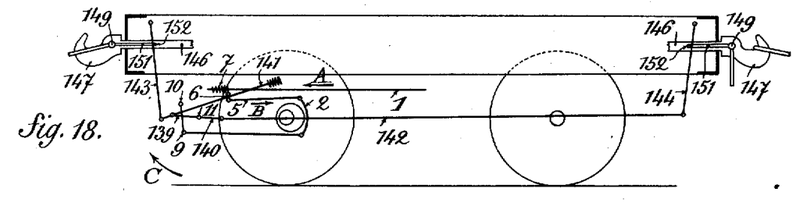
Fig. 18 is a schematic view showing the instalment of a controlling device for the brake which operates upon loosening or breaking of a coupling.

The construction illustrated in Figs. 11 to 17 presents the advantage of regulating automatically the degree of braking in accordance with the load of the vehicle; with this object the controlling shoe 2ᵃ is suspended from the frame of the vehicle by a rod 8ᵇ and presents opposite the axle cam a surface inclined relatively to the vertical. The result is that for a given rotation of the cam 16ᵃ, that is to say for a given position of the axis of oscillation 9ᵈ of the lever 9ᵃ, the displacement imparted to the parts 2ᵃ, 8ᵃ, 9ᵃ, 6ᵃ and 1 by the axle cam 3 will be increasingly large, owing to the effective elongation of the rod 8ᵃ resulting from the inclination of the shoe 2ᵃ according as the axle is closer to the frame and consequently the compression of the spring 7 will be greater in proportion to the load of the frame. It will be seen that this construction combines all the desiderata: the application of the brakes and their release is effected merely by the oscillation of a shaft in one direction or the other, with very slight efforts, and this without any danger of reaction upon the driver's hand; the maximum degree of braking with a given load on the vehicle is maintained constant notwithstanding the wear of the brakes; the extent of the braking is always indicated correctly to the brakesman whatever the degree of wear may be; the intensity of the braking, for a given position of the operating parts is rendered approximately proportionate to the load on the vehicle; in addition, as shown by the drawing, the mechanism is strong, of small volume and easy to mount beneath any kind of truck. It will of course be understood that the control of the shaft 11$^a$ by compressed air or by vacuum may be effected precisely as in the construction previously described with reference to Figs. 1 to 10. The shaft 11 is also controlled by a device operating under the influence of the rupture or loosening of a coupling, so as to apply automatically the brake in case of accident. This device acts on the shaft 11 through the medium of a suitable coupling which can be put in gear at will, so that the brake can be rendered independent of the tension of the couplings and independent also of the opening of the air or vacuum tube as hereinbefore described. In the embodiment of this controlling device shown in Figs. 18 to 20, each draw-bar 146 of the car carries a coupling hook 147 which differs from the usual coupling hooks, in that its opening is prolongated in the direction of the traction and that it is provided with a horizontal slot or guide-way 148 to receive the traction bolt 149 of the screw stretcher or other coupling apparatus, which is provided with a round hole to receive the bolt 149 and prolongated by a rod 151 terminating in a projection 152.

On the shaft 11 is arranged a crank 140, the hub 130 of which is in the shape of a sleeve and is loosely mounted on the shaft; in the said sleve is slidably mounted a clutch bolt 131 movable in a radial direction so as to be enabled to engage in a mortise 132 of the shaft 11. The said bolt consists of a socket having an outer shoulder under which acts a spring 133 and an inner shoulder on which bears a spring 134 stronger than the spring 133. Within the said socket is slidably mounted a piston 135 which bears at one side on the spring 134 and at the other side on a guide-way 136 the greater portion of which is concentric to the shaft 11 and which is provided with an inclined plane 137 and a cavity 138. Such guide-way in the embodiment shown is supposed to be secured to the frame of the car.

Figures 19, 20:
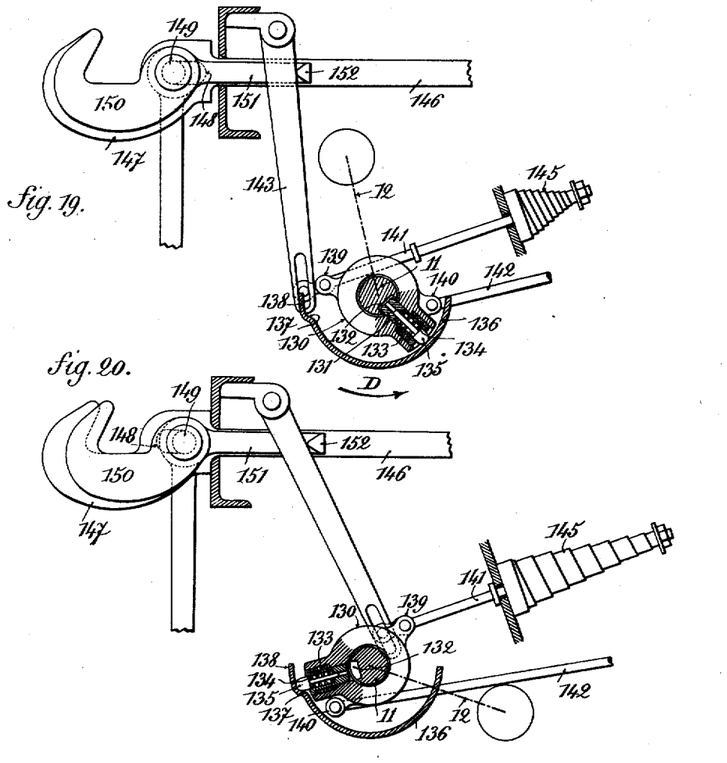
Figs. 19 and 20 represent the device in two different positions.

When the sleeve 130 and the shaft 11 are revolved as shown in Fig. 20 the springs 133 and 134 are relaxed, the spring 133 holding the bolt 131 from engagement with the mortise 132 and the spring 134 holding the piston 135 in contact with the part 138 of the guide-way. If the sleeve remains motionless, the shaft 11 can be revolved independently of the said sleeve to apply or to release the brake. To the contrary, if the sleeve 130 is revolved or turned in the direction of the arrow D, the piston 135 mounts on the inclined plane 137 and compresses the spring 134, so that the bolt 131 engages in the mortise 132 on its arrival in front of the same; the shaft 11 is then clutched to the sleeve 130 and follows the movement of the latter until the piston is again brought in front of the depressed part 138.

The sleeve 130 carries two arms 139 and 140 which are connected by rods 141 and 142 with levers 143 and 144 pivoted to the frame of the car. In one of the said rods, that 141, acts a spring 145 which tends to hold the sleeve in the position shown in Fig. 20, so that the levers 143 and 144 are bearing against the projections 152 of the hooks and pull the latter toward the cross-bars of the head, each bolt 143 thus being applied against the end of the slot 148 located alongside the corresponding cross bar of the head.

When the couplings are not under tension, the spring 145 holds therefore both the sleeve 130 and the false hooks 150, through the medium of the levers 143, 144, in the position shown in Fig. 20. If, at the same time, the shaft 11 is clutched with the sleeve by the spring bolt, it is held in the position for which the brake is applied. The lever 12 provided with a counter-weight and secured to the shaft 11 tends to hold it in such position.

When the couplings which connected the car considered with the adjacent cars are under tension, the draw-bolt 149 of each of them is brought to the outer end of the corresponding slot 148 carrying the false hook 150 along with it; both the hooks 147 and 150 are pulled at the same time, so that each of the hooks 150 is moved to an extent equal to the play of the draw-bolt 149 in the slot 148 increased by the amount of flexion taken by the traction springs of the car. The result is that the projections 152 pull the levers 143 and 144 outwardly, which levers cause the sleeve 130 to turn in the direction of the arrow D, compressing the spring 145 and releasing the brake (see Fig. 19). The brakes of a running train are consequently released so long as the couplings are under tension; but, as soon as the couplings of the car provided with an automatic brake according to this invention are released by the rupture of couplings or otherwise, the spring 145 causes the system of the levers 143, 144 and of the sleeve 130 to swing in such a manner as to produce at once the application of the brake.

With the described arrangement, the hooks 150 do not take any part in the traction of the train and have only to bear the strain required for compressing the spring 145, which may be of less strength than the traction springs. Such false hooks may therefore be much lighter than the traction hooks proper 147.

In the modified form shown in Figs. 21 to 26 the employment of false hooks is avoided and the opening of the coupling hook 147 into which the draw-bolt 149 passes does not require to be prolongated.

In the traction rod 146 is screwed a nut 155 which under the influence of the pull abuts against a movable cross-bar 156 thus compressing a strong spring 157 located between the latter and the head cross-bar 113 of the car. The distance between the cross-bars 156 and 113 is limited by means of bolts 158 which serve also to guide the cross-bar 156. The traction rod passes through a guide 159 secured to the frame of the car and carries at its ends a nut 160; between the said guide and the said nut are interposed a weak spring 161 and a strong spring 162, inclosed in the sleeves 163 and 164; the sleeve 163 is provided with journals 167 to which are pivoted the twin branches of a lever 143 or 144 (see Fig. 26). The swinging axis 165 of the lever 143 is placed underneath the rod 146 and the swinging axis 166 of the lever 144 is placed above the latter, so that if the journals 167 are moved in opposite directions, the lower ends of the levers 143 and 144 are moved in the same direction; such ends are connected by a link 168.

The driving shaft 11 of the brake is connected to the lever 143 by the medium of a rod 142, of a crank 140, and of a clutch device. The latter comprises a slidable sleeve 170 guided on the shaft 11 by a pin 171 and carrying a tooth 172 which is designed to coöperate with a tooth 173 formed on the hub of the crank 140. The sleeve 170 is urged toward the crank by a spring 174 and can be moved away from the same by a bell-crank lever 175 which is actuated by a cam 176 secured on a driving-shaft 177 carrying cranks 178 at its ends, and also a counterbalance lever 179. On the other hand, the crank has a certain amount of play around the shaft 11; its hub is provided with a groove 180 (see Fig. 25) in which is engaged a spur 181 integral with the shaft.

Figures 21, 22:
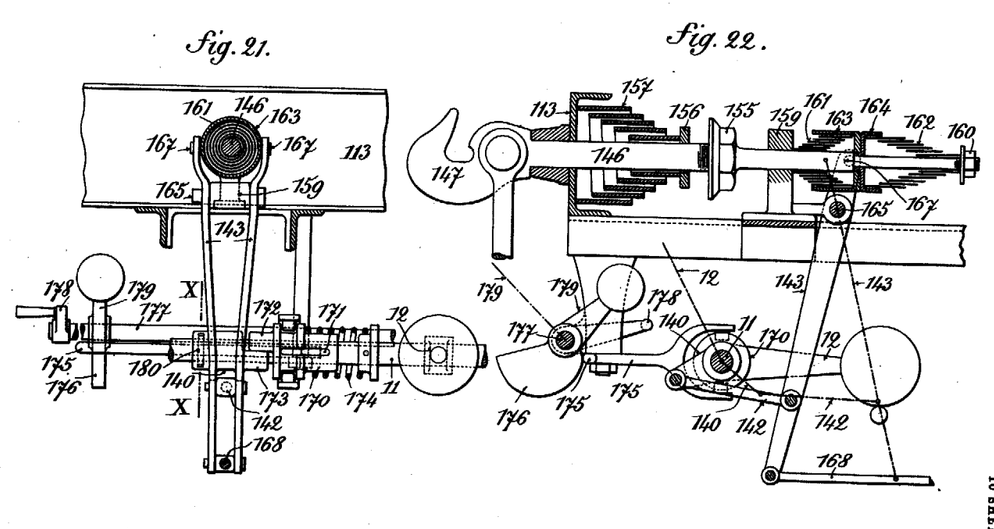
Fig. 21 is a side elevation of another form of this controlling device.
Fig. 22 is a sectional vertical view of same.
Figure 23:
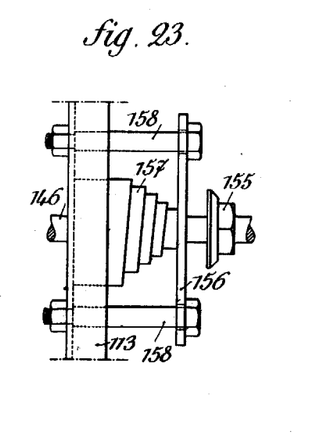
Fig. 23 is a partial plan view of the upper part of the device.
Figure 24:
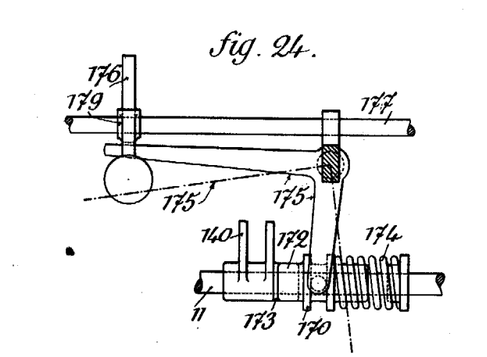
Fig. 24 is a partial plan view of the lower part of same device.
Figure 25:
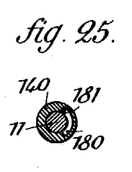
Fig. 25 is a sectional vertical view through the line X X of Fig. 21.
Figure 26:
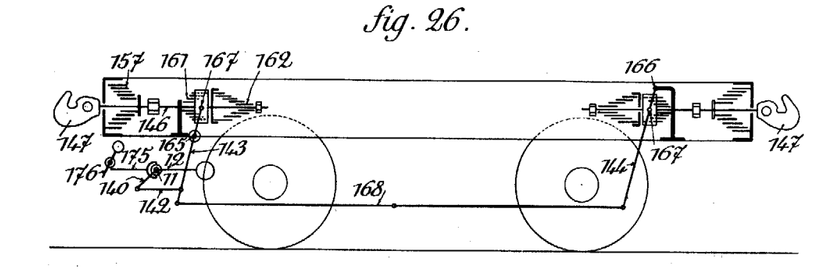
Fig. 26 is a schematic view indicating the location of the device under a wagon.

When the couplings are not under tension, the springs 161 and 163 hold the draw or traction rods, the levers 143, 144 and the crank 140 in the position shown in Figs. 22 and 26; there is now a certain amount of play between the nut 155 and the cross-bar 156. If the crank is at this time clutched with the shaft 11 by the sleeve 170, the said shaft is held at the position corresponding to the application of the brake.

When a traction rod is pulled, the weak spring 161 is, in the first place compressed and the lever 143 is actuated through the medium of the strong spring 162 and the sleeves 164 and 163, so that the said lever, the link 142 and the crank 140 come to the position shown in dotted lines in Fig. 22. The shaft 11 is then brought to the release position through the medium of the clutch mechanism. Should the pull on the couplings come to a close, the tension would cease in the spring 161 and the latter would bring the lever 143 and consequently, the crank 140 and the shaft 11, to the position of the application of the brake.

The automatic control of the brake can be done away with by turning the shaft 177 in such a manner that the cam 176 pushes away the lever 175 and thus moves the sleeve 170 away from the crank 140. The shaft 11 being thus rendered independent, can then be actuated by hand or by means of the other controlling devices hereinbefore described, without any intervention of the variable tension of the springs 157, 161 and 162.

Instead of the lever 144 and the link 168, other connecting systems may be used, such, for instance, a simple link pivoted, at one end, to the lever 143 which is pivoted to one of the sleeves 163, and, at the other end, directly to the second lever 163, provided that the swinging axis 165 of the lever 143 is located between the corresponding sleeve and the said link.

Claims:

1. In a brake of the character described, the combination of a cam secured to the axle of a pair of wheels, a lever actuated by the said cam and connected to the members of the brake, a mechanism serving to move the lever toward or away from the said cam and also to lock the said members in the position for applying the brake, a shaft actuating the said mechanism and which can be operated by hand, a controlling device of the said shaft operating under the influence of the loosening or rupture of a coupling, and clutch mechanism allowing of the shaft being rendered independent of the said controlling device.

2. In a brake of the kind described, locking means for the operating mechanism comprising a pawl serving as a support for a lever connected with the brakework, the bearing surface on this pawl presenting an inclination (relatively to the radii) equal or greater than the angle of friction, and a locking cam which coöperates with a projection on the pawl in such a manner as to prevent by wedging the pawl from being pressed rearward by the reaction of the said lever.

3. In a brake of the kind described, the combination of a pawl serving as a support for a lever connected with the brake work, a locking cam which coöperates with a projection on the pawl in such a manner as to prevent by wedging the pawl from being pressed rearward by the reaction of the said lever, a stud upon the said pawl and a heavy extension upon the locking cam, this stud serving to lift the said extension and the retaining pawl when its cam is brought into the releasing position.

4. In a brake of the kind described, the combination of an operating shaft, of a cam suitable for regulating the position of the operating member and presenting a certain amount of play around this shaft, notches upon this cam, a spring pawl the nose of which is adapted for engaging in these notches, and a sector rigidly fixed upon the operating shaft and presenting inclined surfaces which serve to release this pawl from the notches in the cam when the operating shaft is rotated in the direction for releasing the brake.

5. In a brake of the kind described, the combination with an operating shaft and the operating mechanism serving for the displacement of the cam which regulates the position of the operating member, of a movable arm adapted to strike against a stop fixed to a rod which is connected with the brake rods, in such a manner that the amplitude of the movement of the operating mechanism for the maximum braking is limited by encounter with the said parts and increase automatically with the wear of the brake shoes.

6. In a brake of the kind described, means for indicating the braking characterized by a graduated sector arranged opposite an operating crank and fixed in an adjustable manner relatively to a fixed sector by a spring bolt adapted to be lifted by the said crank every time the latter is pressed to the end of its travel to obtain the maximum braking and the wear of the brake shoes has attained a predetermined limit, in such a manner that the indicating sector is displaced automatically in proportion as the brake shoes wear.

7. In a brake of the character described, a cam on the vehicle axle, a brake operating member adapted to be pushed laterally by such cam, and a suspension rod pivoted to the vehicle frame and on the said member, such member having opposite the wheel a surface so inclined to the vertical as to receive from such cam a lateral motion so much the greater as the frame with the suspension and the said member is lowered to a greater extent in relation to the axle.

8. In a brake of the character described, a controlling device comprising a driving shaft mounted transversely underneath the lower frame of the car, slidable rods with coupling means at the ends of the car, a crank loosely mounted on the shaft, a clutch device suitable for clutching the said crank to the shaft, and a connecting mechanism between the said slidable rods and the said crank, such mechanism having the effect of turning the shaft in the one or the other direction under the influence of the pulling action exercised on the coupling hooks when the crank is clutched to the shaft.

9. In a brake of the character described, a controlling device comprising a driving shaft underneath the frame of the car, slidable rods with coupling means at the ends of the car, a crank on the shaft, a connecting mechanism between the said slidable rods and the crank, and two pairs of springs of unequal strength, each of the slidable rods actuating in one direction the connecting mechanism through the medium of one of the strong springs, and the weak springs contacting the connecting mechanism in the opposite direction.

10. In a brake of the character described, a controlling device comprising a driving shaft underneath the frame of the car, slidable rods with coupling means at the ends of the car, a crank on the shaft, a movable cross-bar on each slidable rod, a strong spring located between the cross-bar and the frame of the car, a nut on each slidable rod adapted to abut against said cross-bar, another nut on the rod, a support secured to the frame of the car, springs located between the last named nut and the said support, and a connecting mechanism between the last named springs and the said crank, a free space being provided between the first nut and the movable cross-bar.

11. In a brake of the character described, a clutch device comprising a toothed sleeve slidable on the driving shaft toward the toothed hub of the crank, a bell-crank lever conducting or leading the said sleeve, and a crank and counter-balance shaft for actuating the said bell-crank lever.

In testimony, that I claim the foregoing as my invention, I have signed my name in presence of two subscribing witnesses.

LOUIS BOIRAULT.

Witnesses:
  Dean B. Mason,
  Maurice Roux.